Oct. 24, 1944. J. L. WHITTEN 2,360,995
STRIP MILL CONTROL
Original Filed Jan. 18, 1939 6 Sheets-Sheet 2

FIG. 2.

INVENTOR.
JAMES L. WHITTEN
BY
*CB Spangenberg*
ATTORNEY

Oct. 24, 1944.   J. L. WHITTEN   2,360,995
STRIP MILL CONTROL
Original Filed Jan. 18, 1939    6 Sheets-Sheet 3

INVENTOR.
JAMES L. WHITTEN
BY
*C. B. Spangenberg*
ATTORNEY

Oct. 24, 1944.    J. L. WHITTEN    2,360,995
STRIP MILL CONTROL
Original Filed Jan. 18, 1939    6 Sheets-Sheet 5

INVENTOR.
JAMES L. WHITTEN
BY
ATTORNEY

Patented Oct. 24, 1944

2,360,995

UNITED STATES PATENT OFFICE 2,360,995

STRIP MILL CONTROL

James L. Whitten, Lakewood, Ohio, assignor to The Brown Instrument Company, Philadelphia, Pa., a corporation of Pennsylvania Original application January 18, 1939, Serial No. 251,557. Divided and this application April 16, 1943, Serial No. 483,233

8 Claims. (Cl. 80—2)

The present invention relates to and comprises improvements in the apparatus for controlling the operation of a continuous strip or analogous metal rolling mill, in which the work pieces, each initially in the form of a billet, ingot, or other compact body, are subjected to repeated rolling operations, effecting relatively great reductions in the cross section of the work pieces.

The general object of the invention is to provide apparatus for controlling the operation of a continuous metal rolling mill of the character described, including provisions for regulating the supply of heat to the furnace from which the heated billets or other work pieces are passed to the rolling mill proper, and for effecting adjustment of the different rolls in suitably related correspondence with variations in the temperature of the billets leaving the furnace, and with variations in the temperature of the billets or work pieces passing through the mill at different points along their path of travel through the mill.

The regulating operations effected in accordance with the present invention, ordinarily comprise variations in the rate at which fuel supplied to the billet furnace in accordance with the heat requirements of the mill and preferably an automatic proportioning of the supplies of combustion air and fuel, and comprise roll adjustments which may comprise either or both adjustments of the roll speeds and adjustments of the displacement of cooperating rolls to vary the roll passes, whereby compensation may be obtained for the increase in power required to operate the rolls, and for the tendency of the cooperating rolls to spring apart and increase the roll pass thicknesses, as the temperature of the work pieces passing through the metal decreases.

While the temperature measurements can be effected with various instrumentalities, I consider it practically desirable, if not essential, to measure the temperature of the work pieces at different points along the path of work travel through the metal by means of photoelectric cells and electronic amplifying means associated with high speed measuring means proper. The practical effect of measuring work piece temperatures with the means just referred to, is that the temperature measurements obtained are practically instantaneous and involve no time lag. No matter how the measurement is attained, the furnace temperature measurement obtained must necessarily involve a time lag factor, because the substantial heat capacity of the furnace and the billets therein means that the furnace temperature at any instant is necessarily an average or resultant of the furnace condition prevailing in the furnace for a considerable preceding period of time.

A still more specific object of the present invention, therefore, is not only to properly correlate the control effects due to the different temperature measurements, but to effect a control system compensation, whereby a change in a plant load condition or demand for heat may result in a quick adjustment of the heat supply sufficient to check the tendency of the change in heat requirement to change temperature conditions, but not large enough to prevent some temperature variation as a result of the change in load demand, coupled with a delayed further adjustment which will tend to restore the normal temperature conditions, without giving rise to the hunting tendency which would result if the last mentioned adjustment were effected simultaneously with the first mentioned adjustments.

Figure 1:
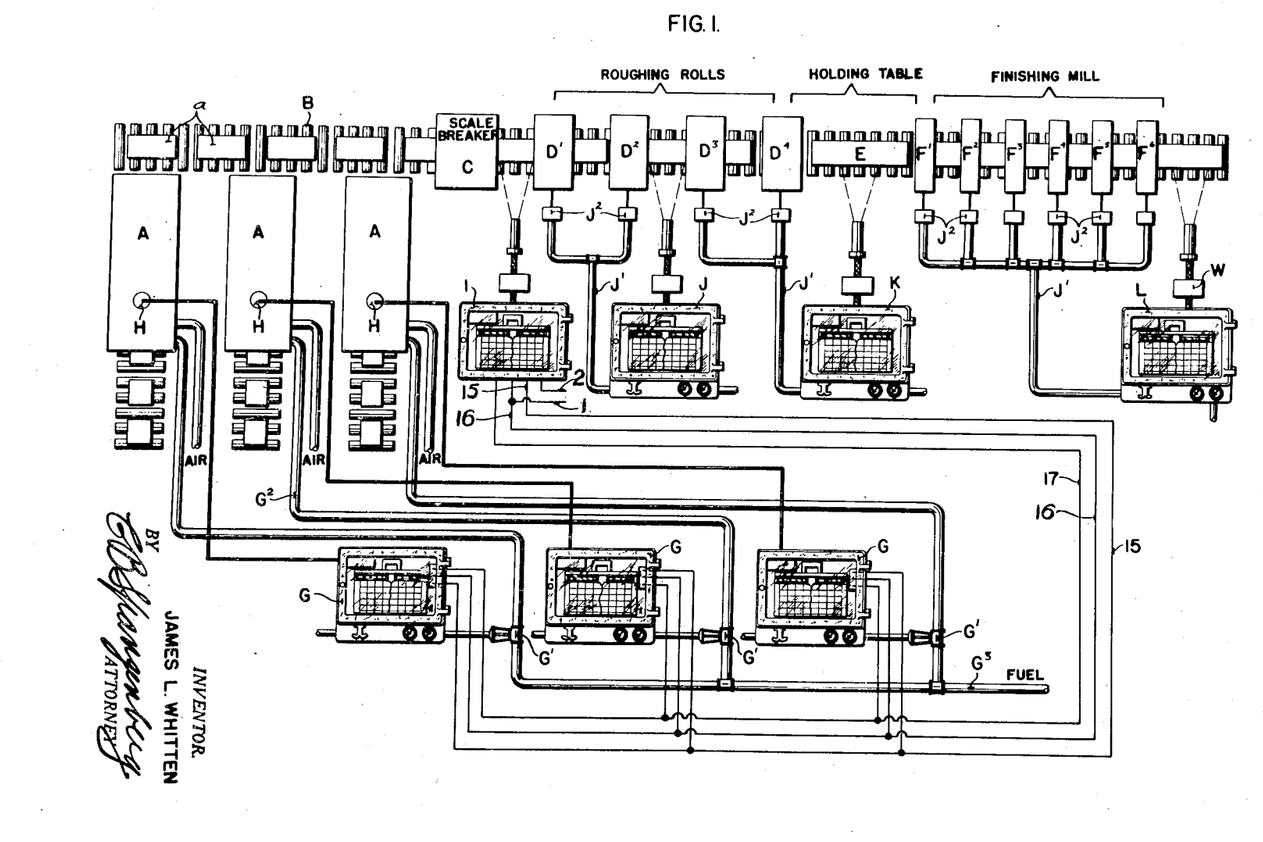
Fig. 1 is a diagrammatic representation of a continuous strip mill including a control system including one form of the present invention.

The embodiment of the invention illustrated diagrammatically in Fig. 1 comprises a plurality, three being shown, of heating furnaces A which supply billets to the conveyor system B of a continuous strip metal mill. The latter, as shown, comprises a scale breaker C through which the billets received from the furnaces A are passed to roughing rolls, shown as comprising four stands $D'$, $D^2$, $D^3$ and $D^4$, arranged in series. From the roughing rolls, the billets are passed on to a holding table E, from which they pass to the finishing rolls, shown as comprising six stands, $F'$, $F^2$, $F^3$, $F^4$, $F^5$ and $F^6$, arranged in series.

As diagrammatically shown in Fig. 1, each furnace is supplied with fluid fuel through an individual branch $G^2$, at a rate controlled by a corresponding control instrument G, and associated regulator $G'$. Each instrument G of Fig. 1, as hereinafter explained, is of a known type, adapted to adjust the corresponding regulator $G'$, in joint response to a temperature condition of the corresponding furnace A, which is measured by the instrument G, and to the temperature of the billets as they pass from the scale breaker C to the roughing rolls. The last mentioned temperature is measured by an instrument I, which, upon a variation in said temperature, effects a corresponding adjustment of each of the three instruments G. As shown, the temperature condition measured by each instrument G, is that to which a thermocouple H in the roof of the corresponding furnace, responds.

The first two stands of roughing rolls $D'$ and $D^2$ are automatically adjusted in accordance with variations in the temperature of the billets as they leave the second stand rolls $D^2$, under the control of an instrument J responsive to said temperature. The adjustment may compensate for a variation in billet temperature either by varying the distance between the two rolls of each stand, or by varying the roll speed. The third and fourth stands of roughing rolls $D^3$ and $D^4$, are similarly adjusted in accordance with variations in the temperature of the billets passing on to the holding table E, by an instrument K responsive to that temperature. The different stands of finishing rolls $F'$ and $F^6$, are subject to simultaneous adjustment by an instrument L, responsive to the temperature of the rolled billets or strips, leaving the finishing rolls.

Each of the various instruments G, I, J, K and L may be of any usual or suitable type adapted to serve the required control purposes. As shown, the instruments are all of the commercial type known as the "Brown potentiometer," but the instrument I is of a form which effects control operations by modifying electric circuit connections, while each of the other instruments includes so-called air controller provisions, for effecting control actions by varying a control air pressure.

Figure 2:
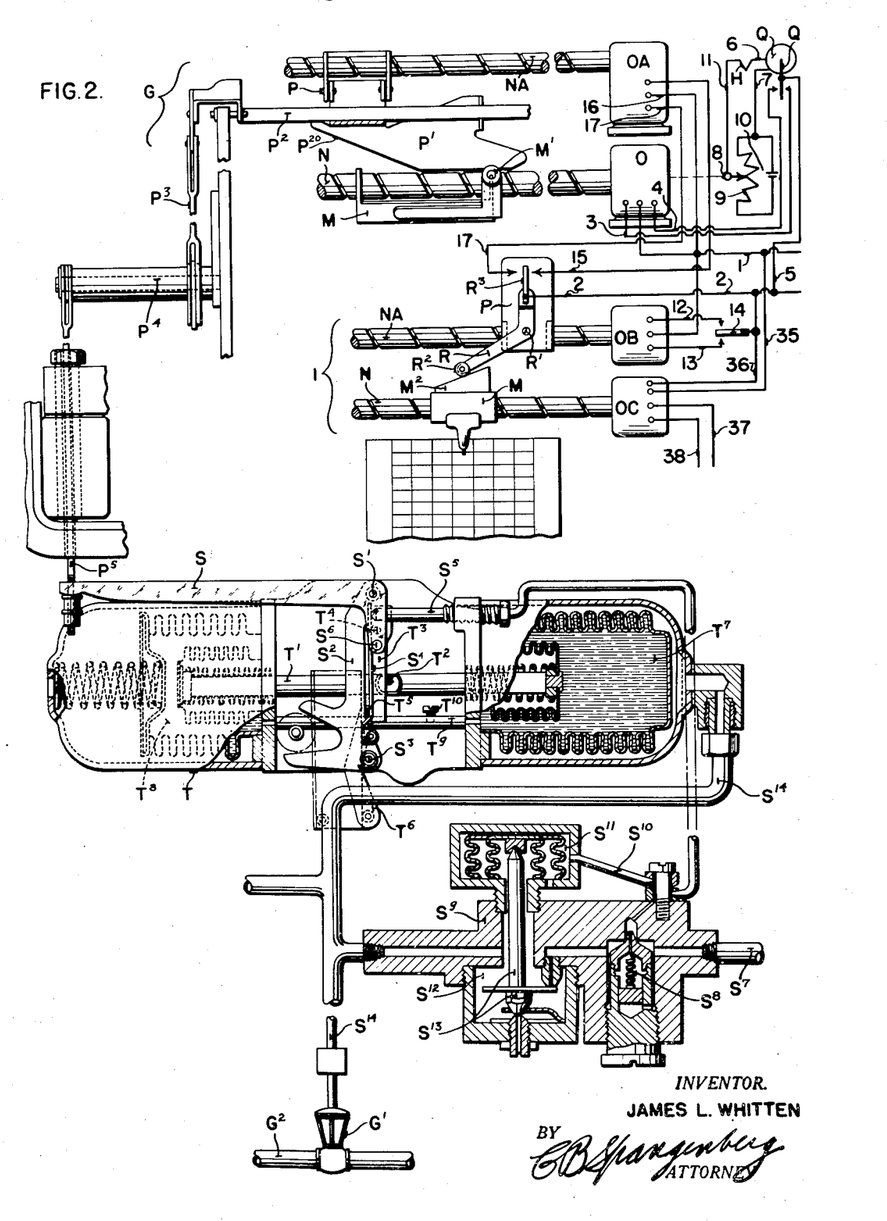
Fig. 2 is a diagrammatic representation of two interlocked measuring and control instruments including in the apparatus shown in Fig. 1.

The characteristic features of the instruments of both forms, in so far as they need to be referred to herein, are shown in Fig. 2, which is a diagrammatic illustration of parts of the instruments G and I. As shown, the instrument G includes a pen carriage M in threaded engagement with a shaft N, which, by its rotation in one direction or the other, adjusts the pen carriage longitudinally of the shaft. The shaft N is rotated in response to variations in the quantity measured by the instrument, through power means, which, as diagrammatically shown in Fig. 2, comprises a reversible electric motor O having its armature shaft connected to the shaft N. The instrument G also includes a spirally grooved shaft NA, parallel to the shaft N, and in threaded engagement with a control table P, which cooperates for control purposes with the pen carriage M of the instrument, as hereinafter described. The shaft NA, as diagrammatically shown in Fig. 2, is rotated by a reversible electric motor OA when the latter is energized as hereinafter described. The instrument I shown in Fig. 2, is exactly like the instrument G in so far as above described, but its motors corresponding to the above mentioned motors O and OA, are designated OC and OB, respectively.

Associated with the motor O of each instrument G, are circuit provisions through which that motor is energized for operation in one direction or the other by an increase or decrease, respectively, in the temperature of the corresponding furnace thermocouple H. Those circuit provisions as shown in Fig. 2, comprises electric supply conductors 1 and 2, the conductor 1 being permanently connected to the common terminal of the motor O, which is energized for operation in one direction or the other by the connection of one or the other of its other terminals 3 and 4, to the supply conductor 2. As shown, the latter is connected by a conductor 5 to the pointer $Q'$ of the instrument galvanometer Q. The latter has one terminal connected by a conductor 6 to one terminal of the thermocouple H, and has its other terminal connected by a conductor 7 to one end of a potentiometer resistance 9. The second terminal of the thermocouple H is connected by a conductor 11 to a slider or contact arm 8, diagrammatically shown as adapted to be oscillated by the rotation of the shaft N, and in engagement with a potentiometer slide wire resistor 9. The latter is energized by a battery or other source of current 10.

The pen carriage M and control table P of each instrument G cooperate to produce control effects, by effecting angular adjustment of the flapper valve of an air controller element included in the instrument, through connections of the character disclosed and claimed in the Moore Patent No. 2,093,119 granted September 14, 1937.

Those connections comprise a cam $P'$, hinge connected to the control table P, and given oscillatory movements by the movement in the direction of the shaft N, of a cam engaging part $M'$ carried by the pen carriage M, when the latter is in the control range, in which the part $M'$ engages the inclined edge $p^{20}$ of the cam part $P'$. The part $P'$ is in sliding engagement with a barlike part $P^2$ which shares the oscillatory movements of the cam $P'$, and thereby, through mechanical connecting parts including a link $P^3$, a rocking element $P^4$, and a link $P^5$, gives oscillatory movements, to the flapper valve actuating element S of the air controller.

The air controller shown is of a form fully disclosed in the patent of Coleman B. Moore, No. 2,125,081 granted July 22, 1938, and now in extensive commercial use. The actuating member S is a lever pivoted at $S'$ to an adjustable fulcrum member $S^2$, in the form of a lever having a stationary fulcrum pivot $S^3$. The movements of the lever S move a flapper valve $S^4$ away from, or permit it to approach a nozzle or bleed orifice member $S^5$. The flapper valve $S^4$ is mounted on a stationary pivot, and is biased for movement in the direction in which it approaches and restricts the discharge through the nozzle $S^5$. The lever S acts on the flapper through a pin $S^6$ carried by a depending arm of the lever.

The nozzle $S^5$ receives air from a pipe $S^7$ supplying air at a suitable and approximately constant pressure, through a restricted passage formed by a small bore pipe $S^8$, included in a pilot or booster valve mechanism $S^9$, so that the pressure in nozzle $S^5$ which constitutes the primary control pressure of the control apparatus, increases and decreases as the flapper valve $S^4$ moves toward and away from the nozzle. The primary control pressure is transmitted by a pipe $S^{10}$ to a chamber $S^{11}$ of the pilot valve mechanism. One wall of that chamber is movable, and separates the chamber $S^{11}$ from a second pilot valve chamber $S^{12}$. The pressure in the latter is regulated by a valve means $S^{13}$ actuated by the said movable wall. The pressure in the chamber $S^{12}$ is thus maintained in constant proportion to the primary control pressure in the chamber $S^{11}$, and constitutes the ultimate control pressure of the apparatus.

The said ultimate control pressure is transmitted by a pipe $S^{14}$ to the pressure motor chamber of the corresponding valve $G'$, and to mechanism, T, forming a part of the control apparatus, and adapted, following and as a result of each initial change in the ultimate control pressure, effected through link $P^5$, to give the lever $S^2$ an initial follow-up adjustment, and a delayed compensating adjustment. The follow-up adjustment neutralizes a portion of the initial adjustment of the flapper valve $S^4$. The delayed compensating adjustment slowly neutralizes more or less of the effect of the preceding follow-up adjustment.

The mechanism T comprises bellows elements, two of which are connected by a connecting rod $T'$, which carries a projection $T^2$. The latter acts on lever $S^2$ through a lever $T^3$ pivoted at $T^4$, and a thrust pin $T^5$ interposed between the levers $T^3$ and $S^2$. The pin $T^5$ is supported by a member $T^6$ adjustable to vary the leverage with which the lever $T^3$ acts on the lever $S^2$. The latter is biased for movement in the clockwise direction, as seen in Fig. 2. Changes in the ultimate control pressure actuate the mechanism T to give longitudinal movements to the rod $T'$ by virtue of the fact that the ends of the latter are connected to the movable ends of oppositely facing bellows elements, each of which is surrounded by a second bellows element having a movable end, and is externally subjected to the pressure in the corresponding interbellows space $T^7$ or $T^8$. The ultimate control pressure acts externally on the bellows element enclosing the space $T^7$. The spaces $T^7$ and $T^8$ are filled with liquid and are in communication through a conduit $T^9$, flow through which is variably restricted by the adjustment of a valve $T^{10}$.

Further reference to the details of construction of the instrument G and the air pressure mechanism included therein are unnecessary, because such instruments and mechanism are not only fully disclosed in the above mentioned Moore patents, but are in extensive commercial use. Moreover, those details form no part of the present invention, which may be practiced with control instruments differing in form and type from those disclosed herein, though it is to be noted that for the attainment of certain advantages of the present invention, the control instruments should include provisions for modifying initial control adjustments by subsequent follow-up or follow-up and compensating adjustments.

On the assumption that the pen carriage M of the instrument G moves to the right or left in response to an increase or decrease in the control range, a movement of the pen carriage to the left as a result of a decrease in the temperature of the thermocouple H, results in a counter-clockwise adjustment of the lever S about its pivot $S'$, permitting the flapper valve $S^4$ to approach the nozzle $S^5$ and thereby increase the primary control pressure. The resultant increase in the ultimate control pressure gives the valve $G'$ an opening adjustment, and when transmitted to the mechanism T, increases the pressure on the bellows element forming the outer wall of the space $T^7$, contracting said bellows element and thereby correspondingly contracting the smaller bellows element connected to the adjacent end of the rod $T'$. The extent of the movement thus given the rod $T'$, depends upon the magnitude of the change in the ultimate pressure, and on the natural resiliency of the bellows elements and other spring bias force opposing the movement of the rod $T'$.

The movement of the rod $T'$ to the left as a result of the increase in the ultimate control pressure, acts through the pin $T^2$, lever $T^3$ and thrust pin $T^5$ to give a counter-clockwise adjustment to the lever $S^2$ about its pivot $S^3$ and thereby move the flapper valve $S^4$ away from the nozzle $S^5$. This follow-up adjustment of the flapper valve partially neutralizes the effect on the control pressures of the initial adjustment of the flapper valve.

The increase in the ultimate control pressure, which, through its action on the bellows forming the outer wall of the space $T^7$, gave the rod $T'$ its above described movement to the left, also increased the pressure in the space $T^7$. When the pressure in $T^7$ is thus increased, relative to the pressure in the other interbellows space $T^8$, liquid begins to flow into the last mentioned space from the space $T^7$ through the restricted conduit $T^9$. As the pressure in the two interbellows space equalizes, the rod $T'$ moves slowly to the right under the action of the resilient forces tending to restore normal lengths of the small bellows elements connected to the ends of the rod $T'$. This second delayed movement to the right of the rod $T'$, gives a compensating adjustment to the flapper valve $S^4$ tending to neutralize the previous and more rapidly effected follow-up adjustment, and thereby to increase the control pressures.

As diagrammatically illustrated, the instrument I, through its electrical control provisions, controls the energization of the motor OA of the instrument G, shown in Fig. 2, and thereby controls the position of the cam $P'$ longitudinally of the shaft NA. Such adjustment of the control table P and its cam $P'$ is commonly referred to as a control point adjustment, and varies the furnace temperature which the instrument G tends to maintain.

The motor OB may be operated to adjust the pen carriage M of the instrument I in accordance with changes in the temperature of the billets leaving the scale breaker C, through temperature measuring provisions associated with the instrument, of any known or suitable type, one known arrangement being illustrated diagrammatically in Fig. 3 and hereinafter described. As shown in Fig. 2, the adjustment of the control table P of the instrument I is subject to manual control. To this end, the common terminal of the motor OB of the instrument I is connected by a conductor 11 to the supply conductor 1, and the second and third terminals 12 and 13 of the motor OB are adapted to be connected to, or disconnected from, the supply conductor 2 by means of a manually operable switch member 14.

The relative adjustments of the pen carriage M and control table P of the instrument I, control the energization of the motor OA of the instrument G shown in Fig. 2, through a switch lever R pivoted at R' on the table P of instrument I, and carrying a cam roll R² at its free end, which is adapted to engage the inclined portion of a cam member M² carried by the pen carriage M of the instrument I. On a decrease in the billet temperature measured by the instrument I, and corresponding adjustment to the left of the pen carriage M of that instrument, the switch lever R is tilted clockwise, whereupon the switch contact R³ carried by said lever, and connected to the supply conductor 2, engages a contact connected by a conductor 15 to one terminal of the motor OA of the instrument G. The common terminal of that motor is permanently connected by a conductor 16 to the supply conductor 1, and said motor OA is then energized to adjust the pen carriage P of the instrument G to the left as seen in Fig. 2.

The last mentioned adjustment produces a control effect on the corresponding regulator G' in the same direction as is produced by a decrease in the temperature measured by the corresponding instrument G. Conversely, an increase in the billet temperature measured by the instrument I results in a counter-clockwise adjustment of the switch lever R, whereby its contact R³ is adjusted to connect the supply conductor 2 to a conductor 17, running to the third terminal of the motor OA of the instrument G. The resultant energization of the last mentioned motor adjusts the control table P of the instrument G shown in Fig. 2 to the left, and thereby produces the same modification of the control action of the instrument G as would be produced by an increase in the furnace temperature thermocouple H connected to that instrument. Since all the instruments G are subject to similar simultaneous adjustments by the instrument I, an increase or decrease in the temperature at which the billets leave the scale breaker C, results in a corresponding decrease or increase respectively, in the rate of fuel supply to each of the furnaces A.

Figures 3, 5:
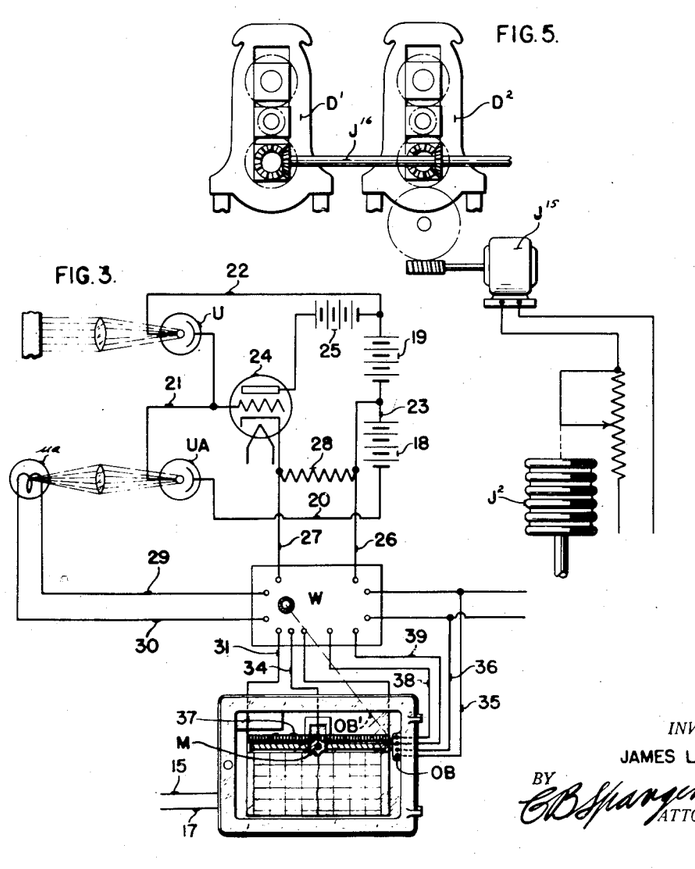
Fig. 3 is a diagrammatic representation of temperature measuring apparatus included in Fig. 1, and comprising a photoelectric cell directly responsive to the work temperature moving in front of the cell.
Fig. 5 is a somewhat diagrammatic representation of another roll adjustment mechanism.

In Fig. 3, I have illustrated an arrangement in which the instrument I is combined in a known manner with photoelectric cells, thermionic tube amplifying means, and current regulating means. As shown in Fig. 3, light is radiated by the billets leaving the scale breaker to a photoelectric cell U, which is thus made responsive to the billet temperature. The cell U is connected in series with a second photoelectric cell UA, receiving light from a lamp ua, and with two similar sources of direct current 18 and 19 diagrammatically shown as batteries. As shown, one terminal of the cell U is connected by a conductor 20 to the negative side of the battery 18, and the second terminal of the cell ua is connected by a conductor 21 of one terminal of the cell U, which has its other terminal connected by a conductor 22 to the positive side of the battery 19. The positive side of the battery 18 is connected to the negative side of the battery 19 by a conductor 23.

The intensity of the light from the lamp ua is regulable, and is normally so adjusted that the two similar photoelectric cells U and UA are similarly illuminated, and since the two current sources 18 and 19 are similar, the circuit including those sources and the photoelectric cells is then in balance, in the sense that there is substantially no difference in potential between the conductors 21 and 23. This balance is disturbed by an increase or decrease in the billet temperature, and consequent change in the intensity of the light transmitted to the cell U. The difference in potential between the conductors 21 and 23 then created is amplified by means including a thermionic tube 24, which has its control grid connected to the conductor 21 and has its plate connected to the positive terminal of a battery 25 which has its negative terminal connected to the conductor 22. A conductor 26 connected to the conductor 23, and a conductor 27 connected to the cathode of the tube 24, constitute the output terminals of the amplifying unit including the tube 24, the terminals 26 and 27 being connected by a suitable high resistance 28.

The amplified potential difference between the conductors 21 and 23, resulting from a variation in billet temperature, is transmitted by the terminals 26 and 27 to a device W, in which said difference may be further amplified, and through which current is supplied to the terminal conductors 29 and 30 of the lamp ua, at a rate which is increased or decreased as a result of said potential difference, as required to again make the illumination of the cells U and UA equal, and thereby rebalance the circuit including the cells U and UA and current sources 18 and 19. The instrument I is arranged to measure and record the energizing current of the lamp ua, and thereby provide a billet temperature measurement record. To this end, in the form shown, the potentiometer slide wire resistor 37 of the instrument I is energized by the device W through conductors 35 and 36, and the potentiometer slide wire contact carried by the pen carriage M of the instrument I and engaging the resistor 37, which, as diagrammatically shown in Fig. 3, extends alongside of the path of movement of the pen carriage, is connected by a conductor 38 to the device W.

The device W need not be illustrated or further described herein as its particular construction forms no part of the present invention, but on the contrary may well be of the type disclosed in the Nichols Patent 2,187,613, of January 16, 1940, and of a particular form of said type, which is now in commercial use, and is Harrison Patent 2,245,033, of June 10, 1941. In said commercial form of apparatus, the motor OB of the instrument I is of the alternating current type, comprising two windings, one of which has its terminals 35 and 36 connected to the supply conductors 1 and 2, while the second motor winding has its terminals 38 and 39 connected to the device W, which serves to impress a potential difference on those conductors of a phase which leads or lags behind the potential of the supply conductors 1 and 2, about 90°, as the billet temperature varies in one direction or the other from the temperature corresponding to the existing illumination of the lamp ua. The phase of the current supplied to the motor by the conductors 37 and 38 on an increase in the billet temperature causes the motor OB to operate in the direction to increase the intensity of the light emitted by the lamp ua until balance is then established accordingly. Conversely, when the billet temperature drops, the phase relation of the current supplied to the two motor windings becomes such that the motor OB operates in the direction to diminish the illuminating effect of the lamp $ua$ until balance is reestablished. In the commercial form of apparatus illustrated in the Harrison application, the same motor OB which adjusts the pen carriage of the temperature measuring of the potentiometer measuring instrument, also adjusts means for regulating the current supply to a lamp corresponding to the lamp $ua$, and in Fig. 3, OB' diagrammatically represents an operating connection between the motor OB, and current regulating means included in the device W for regulating the intensity of the current supply to the lamp $ua$.

The instrument J in conjunction with an associated device W is adapted to measure the temperature of the billets as they pass from the rolls $D^2$ to the rolls $D^3$, just as the instrument I and its associated device W measure the temperature of the billets leaving the scale breaker C. The instrument J, which controls the operation of the first and second stands of roughing rolls D' and $D^2$, may effect that control through electrical control provisions, analogous to those through which the instrument I controls the adjustment of the control table P of the instrument G. As shown, the instrument J may include pneumatic control provisions like those included in the instrument G shown in Fig. 2. As shown, the ultimate control pressure of the instrument J, which varies with the billet temperature measured, is transmitted by a pipe J' to a penumatic control element $J^2$ associated with each of the roll stands D' and $D^2$.

As previously indicated, the effect of a variation in billet temperature on the operation of the rolls through which the billet is passed may be compensated for, in general, either by varying the speed of the rolls or by adjusting the rolls in the manner required to vary the distance between the rolls or roll pass thickness.

Figure 4:
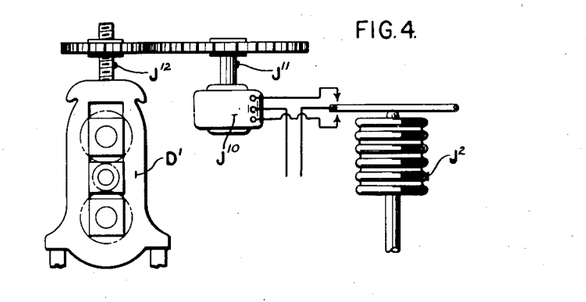
Fig. 4 is a somewhat diagrammatic representation of one form of roll adjusting means.

Thus, as shown in Fig. 4, the control element $J^2$ is employed to control the operation of an intermittently operable reversible motor $J^{10}$, the armature shaft $J^{11}$ of which is connected by suitable gearing to the threaded roll adjusting shaft $J^{12}$ of the roll stand D'. As the temperature of the billet passing through the roll stand D' decreases, the motor $J^{10}$ is set into operation in the direction tending to diminish the roll pass thickness, so as to thereby compensate for the tendency of the relatively cold billet to spring the rolls farther apart than when a hotter billet is being rolled. In the arrangement shown in Fig. 5, the control element $J^2$ shown controls the speed of the motor $J^{15}$ directly driving the rolls in the stand $D^2$. Each of the roll stands controlled by the meter J, may have a separate driving motor, corresponding to the motor $J^{15}$ shown in Fig. 5. In lieu thereof, the rolls in two or more stands D', $D^2$, etc. may be connected by a countershaft $J^{16}$ as shown in Fig. 5, so that they may be driven by a single motor, $J^{15}$. In either case, the roll speed is decreased as the temperature of the billets rolled decreases and the resistance to the passage of the billets through the rolls is correspondingly increased.

The instruments K and L in association with corresponding devices W, are adapted to measure the temperature of the work as it passes over the holding table E, and leaves the final finishing rolls $F^6$, respectively, and to maintain control pressures proportional to the temperatures measured in their respective control pipes J', as the instrument J measures the temperature of the billet leaving the scale breaker and establishes the corresponding control pressure transmitted through its pipe J'. The devices $J^2$ associated with the different roll stands $D^3$, $D^4$, F'—$F^6$, may adjust the speed of operation of rolls in those stands, or the roll pass relation of the rolls, in the manner in which the instrument J controls roll pass and speed adjustments as shown in Figs. 4 and 5.

Figures 6, 7:
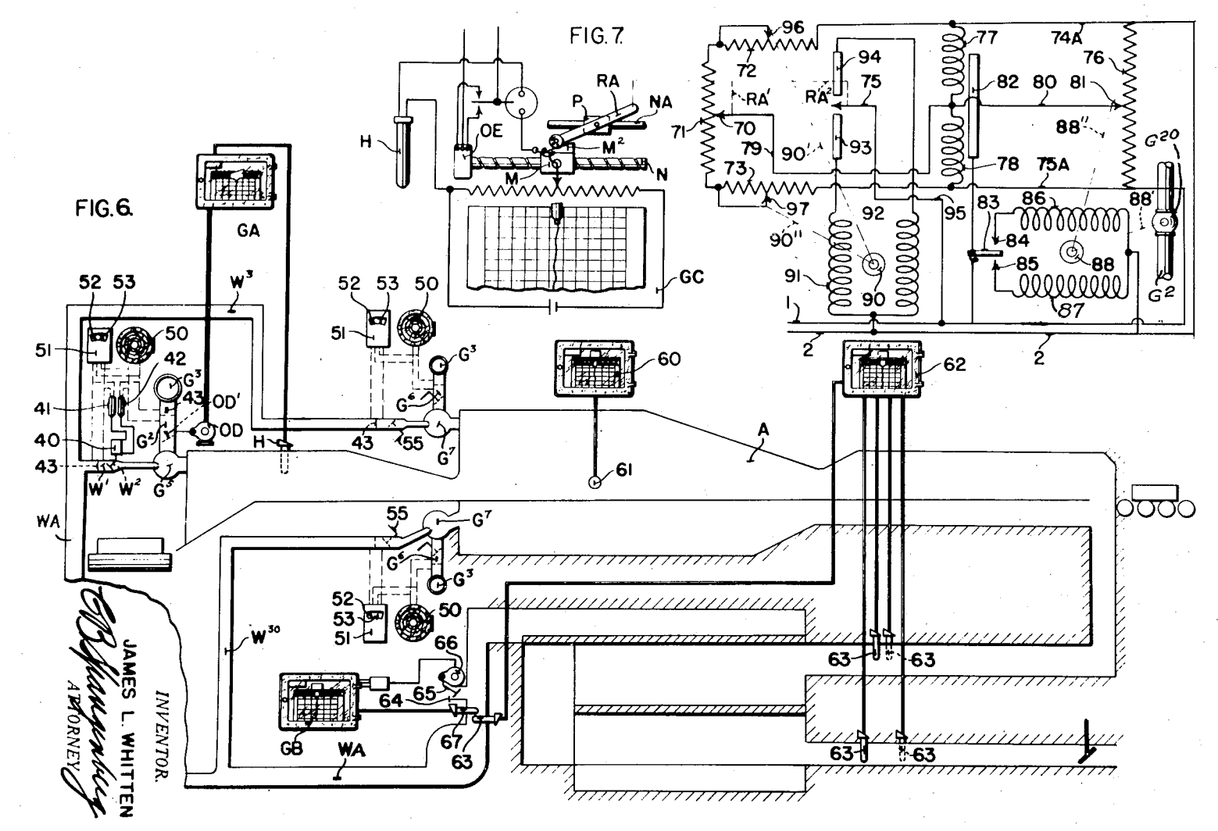
Fig. 6 is a diagrammatic representation of a billet furnace and associated furnace control provisions which may be regarded as a more detailed and specific illustration of apparatus generically illustrated in Fig. 1.
Fig. 7 is a diagrammatic representation of control means of the proportioning system type, which may be used alternately with control provisions shown in Fig. 1.

In Fig. 6, I have illustrated a recuperative type of billet heating furnace, of conventional type, and having associated measuring and control provisions somewhat more complex and highly developed than those suggested by the generic illustration in Fig. 1. In the arrangement shown in Fig. 6, the instrument GA, which measures and records the temperature of the thermocouple H, may be exactly like the instrument G shown in Fig. 2, except that its control operations are effected through an electric motor OD and electircal control provisions like those through which the instrument I controls the motor OA of the instrument G shown in Fig. 2. The motor OD controlled by the instrument GA, automatically adjusts a control damper OD' in the branch $G^2$ of the supply main $G^3$, through which fuel gas is supplied to the main burner $G^5$ of the furnace.

The latter receives preheated air through a branch W' of the conduit WA receiving preheated air for combustion from the recuperator means shown.

The flow of air through the branch W' to the burner $G^5$ is controlled by a damper $W^2$ adjustable to regulate the ratio of air to fuel supplied to the burner $G^5$. As shown, the damper $W^2$ is automatically adjusted by a damper positioner 40, subject to the joint control of devices 41 and 42. The device 41 is responsive to the differential of the pressures at opposite sides of a measuring orifice 43 in the branch W', and the device 42 is responsive to the pressure differential at opposite sides of a measuring orifice 43 in the fuel supply branch $G^2$. The instrument 50, is shown as arranged to measure and record the fuel gas flow through the branch $G^2$, and an indicating instrument 51 has indicating pointers 52 and 53 adapted to indicate the rates at which combustion air and fuel gas are respectively supplied to the burner $G^5$.

The furnace A in the form shown in Fig. 6 is provided with lower and upper auxiliary burners $G^7$, receiving air for combustion from branches $W^{30}$ and $W^3$, respectively, of the recuperator outlet pipe WA, and receiving fuel gas through individual branches $G^6$ from the gas main $G^3$. As shown, the rates at which fuel gas and combustion air pass to each auxiliary burner $G^7$, is measured by means of corresponding measuring orifices 43 and instruments 50 and 51, as are the rates of fuel and air supply to the burner $G^5$. The rates at which fuel gas and combustion air are supplied to each auxiliary burner $G^7$ may be automatically controlled, as are the gas and air supplies to the main burner $G^5$, but, as shown, the supply of fuel gas, and of combustion air, to each auxiliary burner is regulated by a corresponding manually adjustable damper 55.

The mechanism for automatically adjusting the damper $W^2$ as required to maintain the rates at which air and fuel gas are supplied to the burner $G^5$ in constant ratio, need not be further illustrated or described, as air and gas proportioning arrangements suitable for the purpose are well known. In Fig. 6, an instrument 60, which may be exactly like the instrument G in its measuring and recording features, is employed to measure and record the temperature of a thermocouple 61 in the chamber of the furnace A. The instrument 62 shown in Fig. 6 differs from the instrument 60, in that it includes a switch mechanism of well known form, for connecting five thermocouples 63, one at a time in regular succession to the meter. One of the thermocouples 63 is responsive to the temperature in the preheated air supply duct W. Two respond to the respective temperatures in the heating gas inlets of the two recuperators and two respond to the respective temperatures in the heating gas outlets of the two recuperators.

The temperature in the conduit WA is desirably maintained constant, and somewhat lower than the temperature to which air is preheated in the recuperator. To this end, atmospheric air is drawn into the conduit WA through a port 64 in its wall at a rate, regulated, as shown, by a damper 65 adjusted by a damper regulator 66. The latter is controlled by an instrument GB which measures the temperature of a thermocouple 67 responsive to the temperature, of the mixture of air supplied by the recuperators and air passing through port 64. The instrument GB may adjust the regulator 66 through electrical control provisions, like those through which the instrument I adjusts the motor OA of Fig. 2, or through pneumatic control provisions, like those through which each regulator G' of Fig. 2 is adjusted by the corresponding instrument G.

As will be apparent to those skilled in the art, my improved control apparatus may take other forms and may be used for other purposes than those hereinbefore described. For example, as illustrated diagrammatically in Fig. 7, an instrument GC, corresponding generally to one of the instruments G of Fig. 1 and similarly measuring a furnace temperature, may give corrective adjustments to a corresponding fuel supply valve through an electric motor and associated control provisions included in a so-called proportioning system, which comprises means very different in form from those shown in Fig. 2 for effecting compensating adjustments analogous to those resulting from the flow of fluid through the restricted passage $T^9$ of Fig. 2.

The furnace temperature measuring instrument GC of Fig. 7, may be exactly like the instrument G of Fig. 2, in respect to its association with the thermocouple H, and with a second meter employed to angularly adjust its control setting point shaft NA. The movement of the pen carriage M of instrument GC, oscillates a lever RA pivoted on the control table P of the instrument GC, and having a roller at one end in engagement with an edge cam $M^2$ carried by the pen carriage M. The oscillatory movements of the lever RA of Fig. 7 result through a connection RA', in corresponding movements of a contact 70 longitudinally of a slide wire resistance 71, and through a connection $RA^2$, in corresponding movements of a contact 75 in the longitudinal direction of two elongated contacts 93 and 94 arranged in end to end relation. The contacts 93 and 94 are spaced apart, so that in a neutral position of the contact 75, the latter is between and does not engage either of the contacts 93 and 94. The contact 75 is adapted, however, to engage one or the other of the contacts 93 and 94, when the contact 75 is moved from its neutral position downwardly or upwardly, respectively, as seen in Fig. 7. The resistor 71 is interposed between adjustable resistances 72 and 73, connected in series with the resistance 71 between the proportioning bridge circuit conductors 74A and 75A, on which the bridge energizing potential difference is impressed, as shown, by connecting the conductors 74A and 75A to supply conductors 2 and 1, respectively. Said conductors 74A and 75A are also connected by a slide wire resistance 76, and by two solenoid coils 77 and 78 connected in series with one another. The junction point between the series connected coils 77 and 78 is connected by a conductor 79 to the previously mentioned contact 70, and is connected by a conductor 80 to a contact 81 engaging and adjustable along the length of the slide wire resistance 76.

In a normal balanced condition of the apparatus with each of the contacts 70, 75 and 81 in mid position, there will be no current flowing in conductor 79 or 80. When the contact 70 is displaced from its mid position, thereby varying its potential relation with the supply conductors 1 and 2, current will flow through the conductor 79, such current flow will make the current flows in the coil 77 and 78 unequal, and an armature 82 in inductive relation with the coils 77 and 78, will thereby be moved up or down, as seen in Fig. 7, accordingly as the current flow in the coil 77 is then greater or less than the current flow in the coil 78.

An up or down movement of the armature 82 moves a switch contact 83 into engagement with contact 84 or contact 85, respectively. Contacts 84 and 85 are connected to the terminals of the two field windings 86 and 87, respectively, of a reversible relay motor 88. The contact 83 is connected to the supply conductor 1, and the second terminals of the field windings of the motor 88 are both connected to the supply conductor 2. The rotation of the armature of the motor 88 adjusts a fuel control valve $G^{20}$ in the corresponding fuel supply pipe $G^2$, and gives a follow-up adjustment to the contact 81 through operating connection 88' and 88", respectively.

In the operation of the apparatus shown in Fig. 7, on an increase, for example, in the temperature of the thermocouple H, the resultant movement of the pen carriage M to the right, gives a counter-clockwise adjustment to the lever RA, and an up adjustment to each of the contacts 70 and 75. The up adjustment of the contact 70 diminishes the current flow through the winding 77 and increases the current flow through the winding 78, with the result that the armature 82 moves downward, bringing the contact 83 into engagement with the contact 85. This energizes the winding 87 of the motor 88, and the latter then rotates in the direction to give a closing adjustment to the valve $G^{20}$, and to move the contact 81 downward as seen in Fig. 7. The down adjustment of the contact 81, diminishes the current flow in the relay winding 78, relative to the current flow in the relay winding 77, and continues until the current flows through the coils 77 and 78 are again equalized.

If the control circuit of Fig. 7 including nothing beyond what has already been described, it could be proportioned and calibrated, to give stable regulation of the dropping characteristic type, whereby when the furnace demand for heat, or load, increased above or fell below a certain intermediate normal furnace demand or load determined by the adjustment of the apparatus, the resultant change in the rate of fuel supply to the furnace, will be somewhat less than is necessary to maintain the thermocouple H at the temperature which it will have with said intermediate normal demand for heat. In other words, with such regulation the furnace temperature furnace maintained is not constant, but increases and decreases as the demand for heat, or furnace load, respectively, decreases and increases.

To secure stable regulation while maintaining the temperature of the thermocouple H approximately constant, nothwithstanding fluctuations in the demand on the furnace for heat, I employ suitable compensating provisions. The latter, as shown in Fig. 7, comprises a reversible electric motor 90 having two windings 91 and 92, each having one terminal connected to the supply conductor 2. The other terminals of the windings 91 and 92 are connected to elongated contacts 93 and 94, respectively, arranged in end to end alignment at opposite sides of the neutral position of the contact 75. The latter is connected by a conductor 95 to the supply conductor 1. In consequence, on an increase in the temperature of the thermocouple H and consequent movement to the right of the pen carriage of the instrument GC, and consequent up movement of the contact 75 into engagement with the contact 94, the motor 90 will be energized for operation in one direction. Conversely, on a decrease in the temperature of the thermocouple H and movement of the contact 75 down into engagement with the contact 93, the motor 90 is energized for operation in the opposite direction.

The rotation of the motor 90 adjusts a contact 96 along the slide wire resistance 72 in one direction, through a connection 90", adjusts a contact 97 in the opposite direction along the slide wire 73. The contacts 96 and 97 form parts of shunt connections for short circuiting portions of the resistances 72 and 73, respectively. The adjustment of each of the contacts 96 and 97 thus produced, is always in the direction to augment the change in the potential of the contact 70, resulting from the adjustment of the latter, causing the adjustment of the contacts 96 and 97. Thus, when the initial adjustment of the contact 70 is upward as a result of a decrease in the temperature of the thermocouple H, so as to diminish the potential difference between the contacts 70 and the bridge side conductor 74, the resultant adjustment of the contact 72 will be to the right, thereby diminishing the portion of the resistance 72 in circuit. The adjustment of the contact 96 diminishing the portion of resistance 72 in circuit is attended by a corresponding adjustment of the contact 96 to the left, thereby increasing the amount of the resistance 73 in circuit. Generally speaking, the adjustments of the contacts 96 and 97 will lag behind, and proceed at a considerably slower rate than the adjustment of the contact 70, which gives rise to the adjustments of the contacts 96 and 97. The relative rates at which the different adjustments will be effected in any case should depend, as those skilled in the art will understand, upon various factors and particularly upon the rapidity with which the furnace temperature chamber measured by the thermocouple 8 varies in response to a change in the rate at which fuel is supplied to the furnace.

Figure 8:
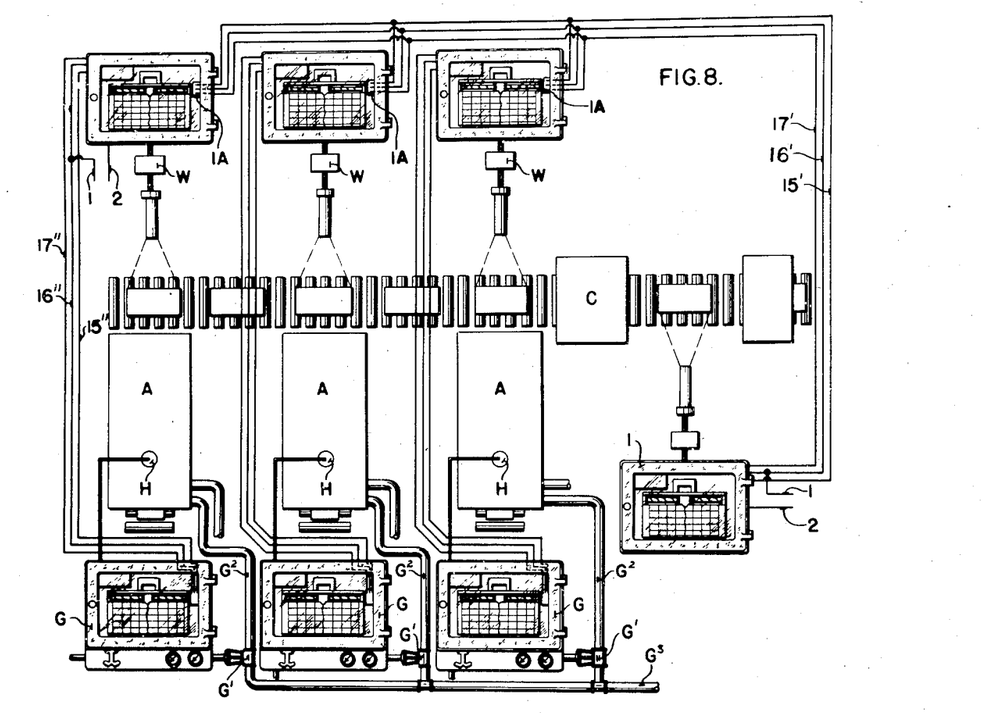
Fig. 8 is a diagrammatic representation of a modification of a portion of the apparatus shown in Fig. 1.

The general principles of the present invention can be used in control system arrangements specifically quite different from that shown in Fig. 1. Thus, for example, in the system shown in Fig. 8, the instrument I which measures the temperature of the billets leaving the scale breaker C, is interlocked with, and controls the setting point adjustment of each of three meters IA, each generally like the meter I, and employed to measure the temperature of the billets, respectively delivered to the conveyor rolls B from the three furnaces A. The interlocking conductors 15', 16' and 17' connect the meters I and IA of Fig. 8, as the interlocking conductors 15, 16 and 17 connect the meters I and G in the control system shown in Figs. 1 and 2. Each meter IA is interlocked in turn with the meter G, which measures the temperature of the roof thermocouple H of the corresponding furnace H, and controls the fuel regulator G' for that furnace. In Fig. 8, the set of interlocking conductors 15", 16" and 17" which connect each instrument IA and the corresponding instrument G, serve the same purposes as the conductors 15, 16 and 17, connecting the interlocked meters I and G of Figs. 1 and 2. In consequence, the regulation of each regulator G' is jointly dependent on three factors, namely the temperature of the corresponding furnace A, the temperature of the billets discharged from that furnace, and the temperature at which the billets leave the scale breaker C. Except in respect to the described arrangement features, the control system shown in Fig. 8 may be like that shown in Fig. 1.

Figure 9:
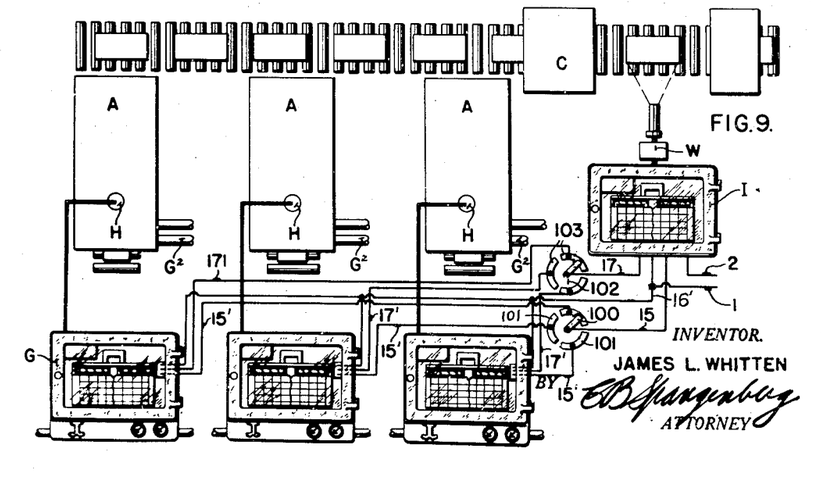
Fig. 9 is a diagrammatic representation of a second modification of a portion of the control system shown in Fig. 1.

In the control system arrangement hereinbefore described, the fuel regulators G' of the different furnaces of a continuous mill, are simultaneously subjected to adjustments dependent on the temperature of a billet leaving the scale breaker C. In Fig. 9, I have diagrammatically illustrated an arrangement including a selector switch mechanism for successively subjecting the different instruments G each to a control point adjustment in accordance with the billet temperature then being measured by the instrument I. As diagrammatically shown in Fig. 9, the interlocking conductor 15 extending away from the instrument I is connected to the revoluble switch arm 100 of a selector switch mechanism comprising three cooperating stationary switch contacts 101 arranged in a series extending circularly about the axis of revolution of the contactor 100, and respectively connected by corresponding conductors 15' each to a terminal of the motor OA of one of the instruments G, all of which are permanently connected to the conductor 15 in the arrangement shown in Figs. 1 and 2. Similarly, in Fig. 9, the conductor 17 extending away from the instrument I is connected to the revoluble switch arm 102 of the selective switch mechanism including a second set of stationary contacts 103 arranged in series extending circularly about the axis of rotation of the contactor 102 so as to be successively engaged by the latter when it is rotated. Each contactor 103 is connected by a corresponding conductor 17' to that terminal of the corresponding instrument G which is connected permanently to the conductor 17 in the arrangement shown in Figs. 1 and 2.

The revoluble conductors 100 and 102 may be mounted on a common shaft and continuously rotated by a motor, or manually, as in selective switch mechanisms in common use to connect a plurality of measuring circuits successively to a common measuring instrument. As will be apparent whether the selector contactors 100 and 102 are revolved automatically or manually, their engagements with the different contacts 101 and 102, respectively, may be synchronized with reference to the discharge of billets to the mill from the different furnaces A, so that each meter G will be interlocked with and subject to an interlocking adjustment by the instrument I, while the latter is measuring the temperature of a billet received by the mill from the particular furnace A, having its fuel regulator G' controlled by that instrument G.

Figure 10:
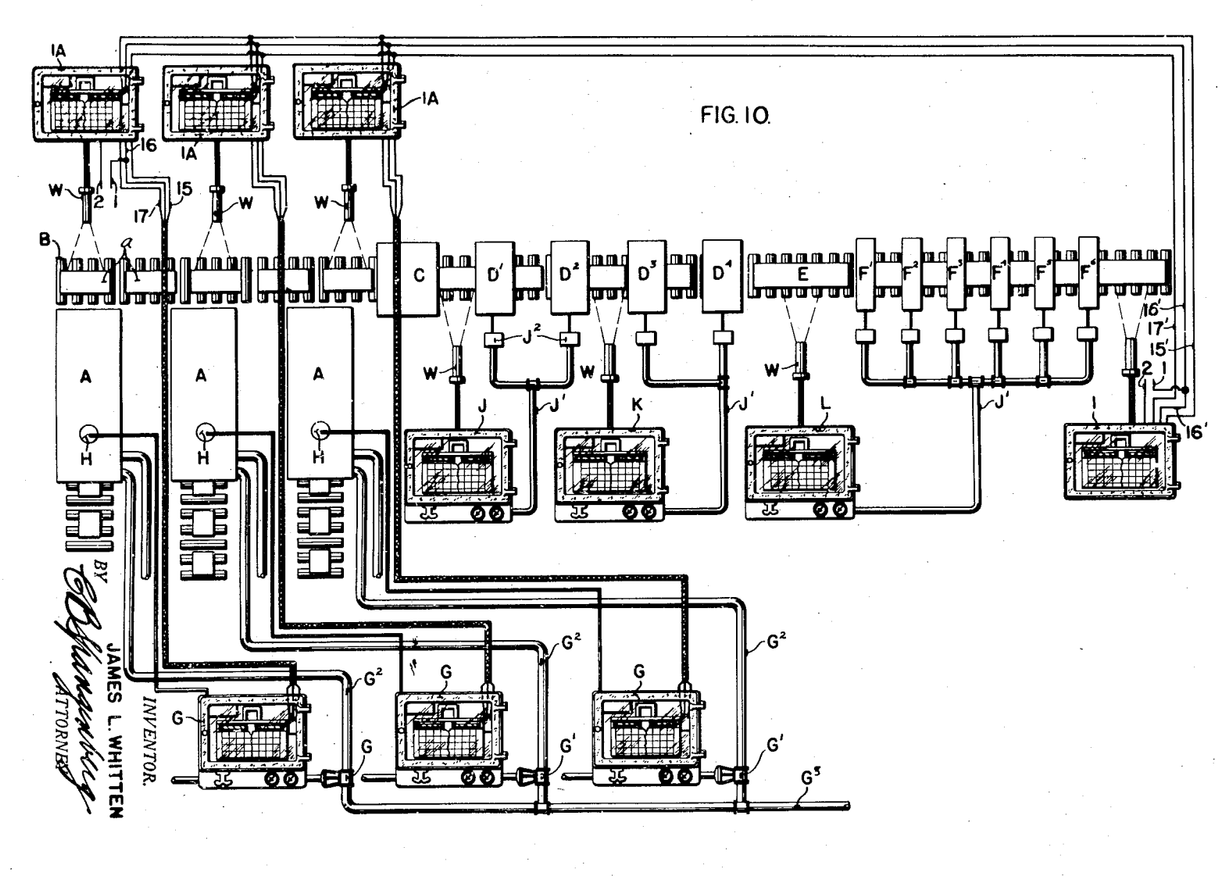
Fig. 10 is a diagrammatic illustration of still another modification of the apparatus shown in Fig. 1.

In Fig. 10, I have illustrated another embodiment of my improved control system, differing from that shown in Fig. 1 in a number of respects. In Fig. 10, the instrument J for adjusting the operation of the first roughing rolls D' and D², is responsive to the temperature of the billets passing to those rolls instead of to the temperature of the billets leaving those rolls. Similarly, the instrument K adjusts the final roughing rolls D³ and D⁴ in response to the variations of the temperatures of the billets passing from the rolls D² to the rolls D³, and the instrument L adjusts the various finishing rolls F'—F⁶ in response to the temperature of the billets passing to the finishing rolls over the holding table E. In Fig. 10, instruments IA are interlocked as Fig. 8, with an instrument I, which, in Fig. 10, measures the temperature of the billets leaving the final stand F⁶ of finishing rolls. Each instrument IA of Fig. 10, measures the temperature of the billets passing to the mill from a particular furnace, and is interlocked with, and regulates the control point adjustment of the instrument G controlling the fuel supply to that furnace, as in the arrangement shown in Fig. 8. This case is a division of my application Serial No. 251,557, filed January 18, 1939, now Patent 2,343,392, issued March 7, 1944.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a continuous strip mill, the combination of a plurality of heating furnaces, a plurality of stands of rolls distributed along path of travel of heated work pieces passing into said path from the different furnaces and means for supplying heat to each of said furnaces at a rate jointly dependent on a temperature condition in that furnace and on the temperature of the work pieces passing through an intermediate portion of said pathway, and means for adjusting one or more of said stands of rolls on and in accordance with variations in the temperature of the work pieces approaching each stand of rolls so adjusted.

2. In a metal rolling mill, the combination with a plurality of stands of rolls distributed along the path of travel of heated work pieces to act successively on said pieces, and means responsive to the temperature of the work pieces at a point along said path adjacent one of said stands of rolls, and adapted, on each variation in the temperature at said point, to adjust the operation of said one stand of rolls in a direction and to an extent dependent on the direction and extent of said variation in temperature.

3. In a metal rolling mill, the combination with a plurality of stands of rolls distributed along the path of travel of heated work pieces to act successively on said pieces, and means responsive to the temperature of the work pieces at a point along said path adjacent one of said stands of rolls and adapted on variations in the temperature at said point to correspondingly adjust the speed of the rolls in said one stand of rolls.

4. In a metal rolling mill, the combination with a plurality of stands of rolls distributed along the path of travel of heated work pieces to act successively on said pieces, and means responsive to the temperature of the work pieces at a point along said path and adjacent one of said stands of rolls and adapted on a variation in one direction or the other in the temperature at said point to correspondingly increase or decrease the roll pass thickness of said one stand of rolls.

5. In a continuous strip mill, the combination with a plurality of stands of rolls distributed along the path of travel of heated work pieces to act successively on said pieces, and means separately responsive to the temperature of the work pieces at different points along said path and adapted, on a variation in one direction or the other at each of said different points to effect an adjustment dependent in direction and extent on the direction and extent of said variation in the operation of stands of rolls respectively adjacent the said point at which the temperature variation occurs.

6. In a continuous strip mill, the combination with a plurality of stands of rolls distributed along the path of travel of heated work pieces to act successively on said pieces, and means separately responsive to the temperature of the work pieces at different points along said path and adapted, on variations in the temperature at said different points to correspondingly adjust the speed of the rolls in stands of rolls respectively adjacent the said points at which the temperature variations occur.

7. In a continuous strip mill, the combination with a plurality of heating furnaces, of means for passing work pieces heated in the different furnaces along a path of travel, a plurality of stands of rolls distributed along said path, and means responsive to the temperature of each work piece moving along said path and to a temperature in the furnace from which the work piece passed to said path, for regulating the rate of heat supply to said furnace, and means for adjusting one or more of said stands of rolls on and in accordance with variations in the temperature of the work pieces approaching each stand of rolls so adjusted.

8. In a continuous strip mill, the combination with furnace means for heating work pieces to be rolled, means for passing said work pieces from said furnaces means along a path of travel, a plurality of stands of rolls distributed along said path, and means responsive to the temperature of the work pieces moving along said path for regulating said heating means and for adjusting some of said stands of rolls in response to variations in the temperature of work pieces moving along said path.

JAMES L. WHITTEN.